United States Patent

Anderson et al.

[11] 4,108,249
[45] Aug. 22, 1978

[54] AGRICULTURAL IMPLEMENT WITH CONSTANT FRAME ATTITUDE MAINTAINING MECHANISM

[75] Inventors: Carl M. Anderson, Claremore, Okla.; Robert L. Poland, Kewanee, Ill.

[73] Assignee: Chromalloy Farm and Industrial Equipment Co., Kewanee, Ill.

[21] Appl. No.: 812,321

[22] Filed: Jul. 1, 1977

[51] Int. Cl.² .............................................. A01B 59/04
[52] U.S. Cl. .................................... 172/328; 280/414.5
[58] Field of Search .............. 172/582, 328, 327, 326, 172/413, 678; 280/414.5

[56] References Cited

U.S. PATENT DOCUMENTS

| | | | |
|---|---|---|---|
| 2,320,742 | 6/1943 | Newkirk | 172/328 |
| 2,717,479 | 9/1955 | Scheidenhelm | 172/328 |
| 3,082,830 | 3/1963 | McKay | 172/328 |
| 3,299,966 | 1/1967 | Clifford | 172/582 |
| 3,708,018 | 1/1973 | Wilbeck | 172/328 |
| 3,809,165 | 5/1974 | Miller | 172/678 |
| 3,912,017 | 10/1975 | Rehn | 172/328 |

*Primary Examiner*—Richard J. Johnson
*Attorney, Agent, or Firm*—George F. Lee

[57] ABSTRACT

A disc harrow has a shock absorbing and frame attitude maintaining mechanism which embodies a bell crank lever pivotally connected at its apex to the hinged hitch structure of the implement frame. One arm of the lever is operatively connected through a rigid link to the rockshaft which is axially rotated to raise and lower the transport wheels of the implement. The other arm of the lever is connected to one member of a vertically extending spring-loaded link having a second member anchored to the implement frame. This second member has a pair of stops between which a spring is confined in compression; and the first member acts on the spring against one or the other of said stops in response to both raising and lowering of the transport wheels to maintain a constant frame attitude.

16 Claims, 7 Drawing Figures

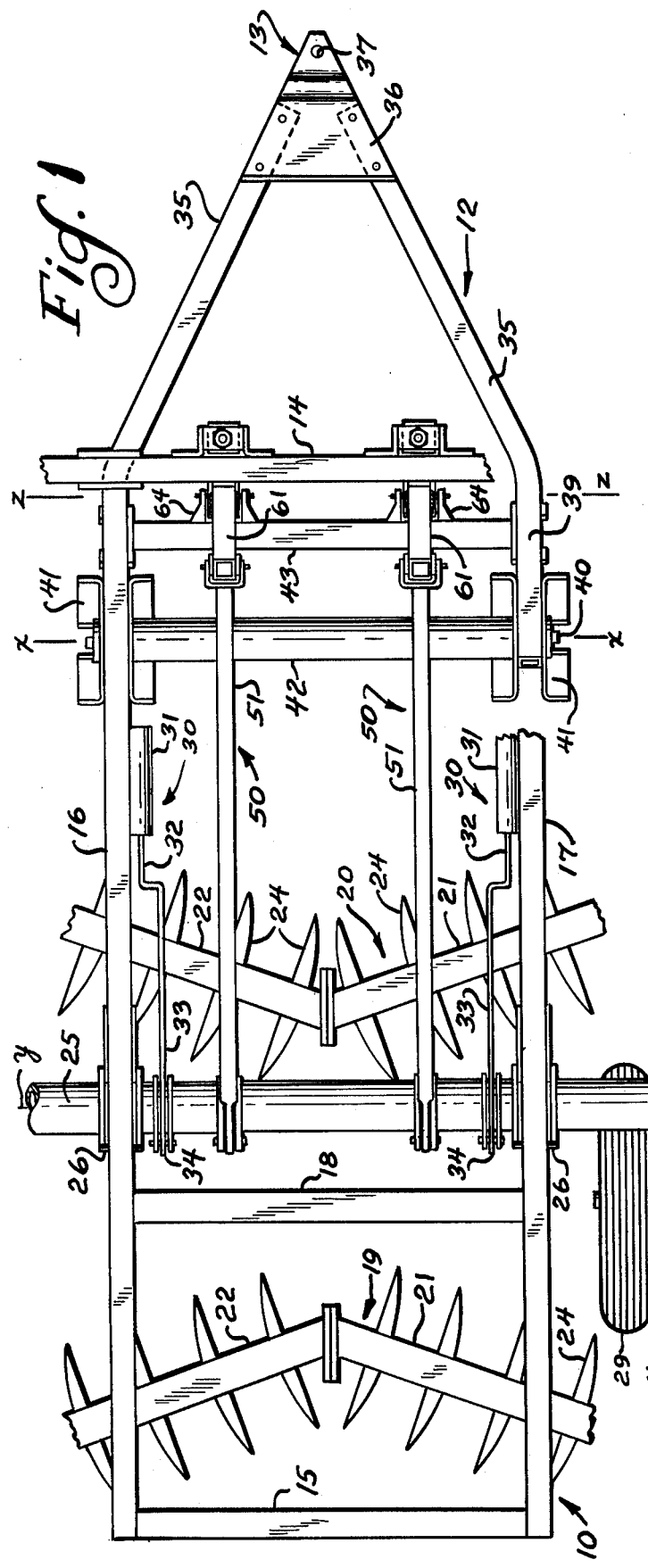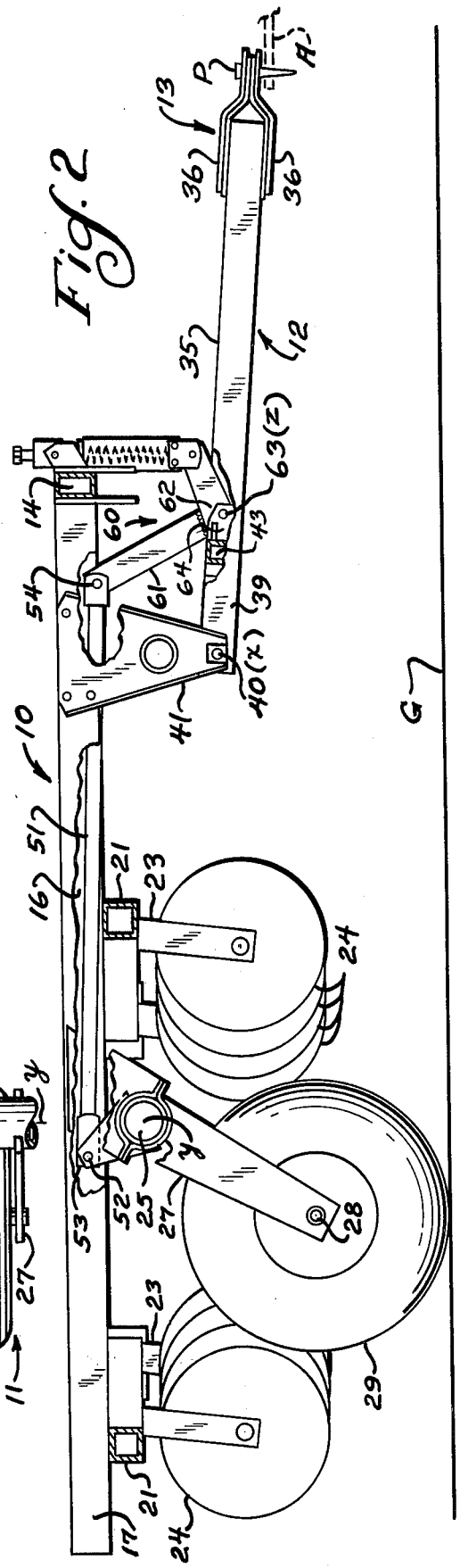

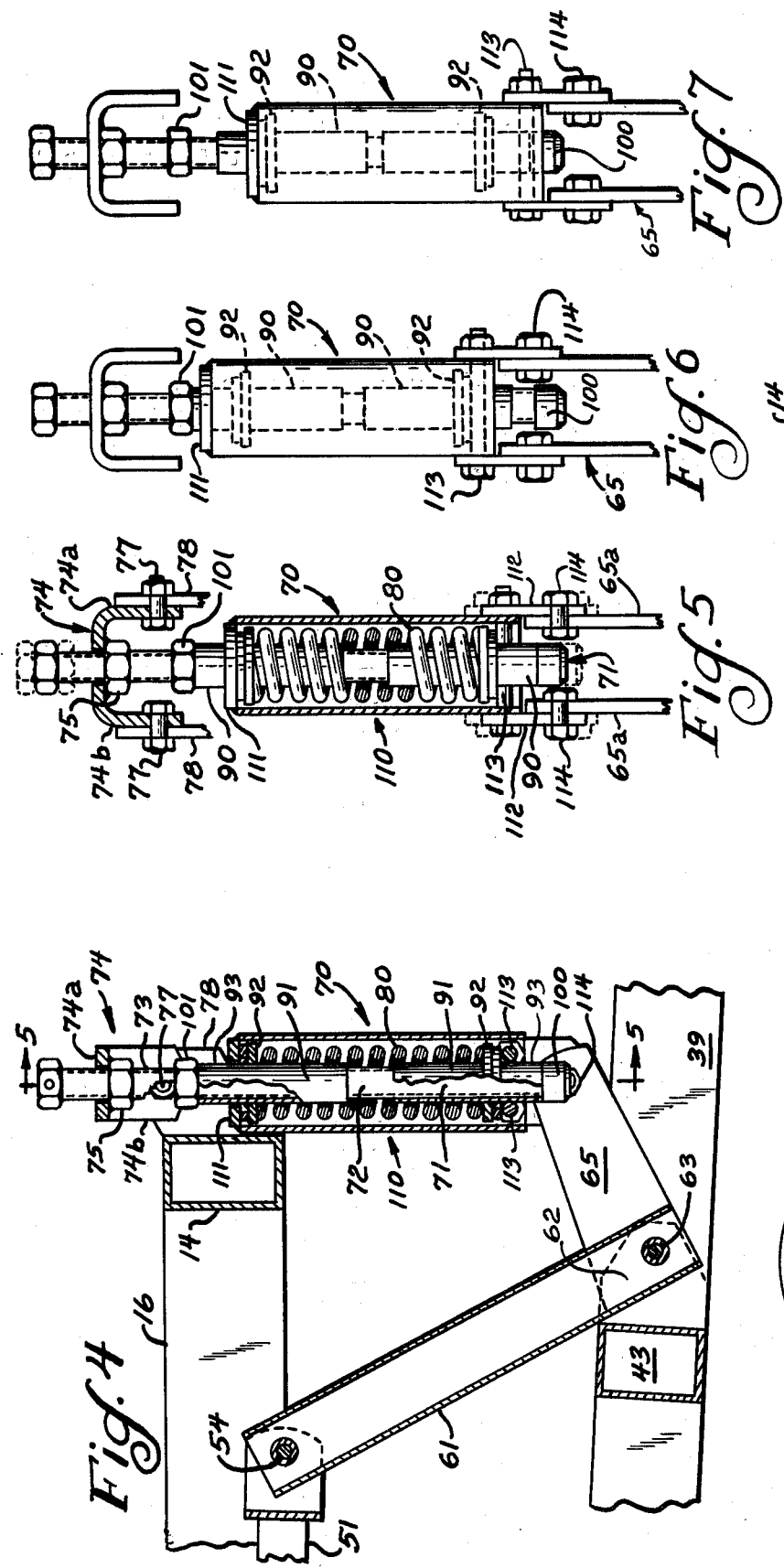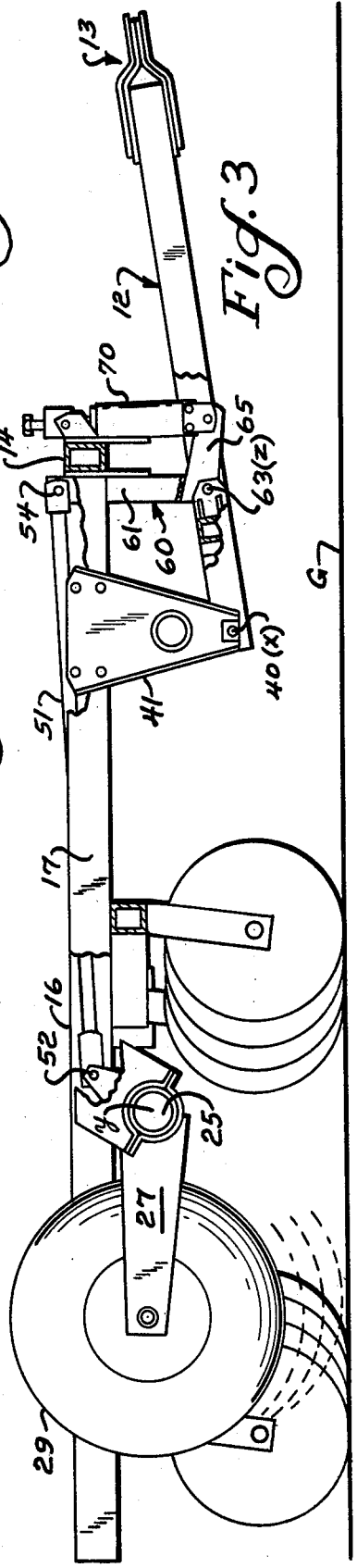

AGRICULTURAL IMPLEMENT WITH CONSTANT FRAME ATTITUDE MAINTAINING MECHANISM

This invention relates generally to agricultural implements such as disk harrows and the like having an elevatable tool supporting frame and relates particularly to novel and improved mechanisms for maintaining the attitude of the implement frame constant at different levels to which the frame is raised and lowered.

Conventionally, such implements embody a tool supporting frame having a tractor hitch structure hinged to the forward end thereof to swing vertically about a horizontal transverse axis. The frame is supported on ground engaging wheels mounted in offset relation to the transverse axis of a rockshaft rotatably fixed to the frame behind said hitch hinge axis and usually between front and rear gangs of tools carried by the frame. By rotating the rockshaft about its axis, the implement wheels can be swung between a transport position wherein the frame is supported with its tools spaced above the ground surface and a tilling position in which the tools are able to penetrate the soil under the load of the implement.

In the past, it was common to connect a rigid link between the rockshaft and the hitch structure so that the hitch structure would vertically swing about its hinged connection in response to vertical adjustment of implement wheels so that the frame would remain level or horizontal in both the raised and lowered position of the implement wheels. Often a ratchet or other device would be employed which would permit changing the length of the link to accommodate connection of the hitch connection to different tractor drawbar heights. Such also would allow the operator to vary the weight distribution of the frame on its front and rear tool gangs in the soil tilling position.

With the advent of larger and heavier implements, there has been a gradual shift to a spring-type linkage which will more responsively compensate for increased shock loads and severe loading conditions imposed upon the tractor hitch than by the earlier rigid linkage system. In one type of spring-type linkage presently in use, the rigid link is dispensed with and a spring is arranged in compression between the forward end of the implement frame and the hitch structure. The spring allows the hitch to deflect and the frame maintains an approximately constant attitude as it is raised and lowered by its transport wheels between transport and tilling positions. However, the weight transfer to the front of the implement frame is such that in order to maintain the frame level in transport, the hitch must also transfer a significant part of the load to the tractor drawbar when the implement is lowered to a tilling position. On the other hand, with the wheels lowered to raise the frame to its transport position, the geometry of the wheel support is such that there is considerable tendency for the spring to deflect and the implement to rock on its wheel support, causing fore-and-aft instability, particularly in high speed transport.

In Clifford, U.S. Pat. No. 3,299,966, there is disclosed an arrangement wherein use of a fore-and-aft extending link to interconnect the rockshaft with the hitch member is continued but through the intermediary of a bell crank which pivots at its apex on the forward end of the implement frame and the movement of which is cushioned by a spring connection thereof to the hitch member.

On the other hand, in Rehn U.S. Pat. No. 3,912,017, an alternative to Clifford is disclosed in which the fore-and-aft link is also connected to one arm of an upright lever pivotally connected to the forward end of the frame. However, a compression link of adjustable length replaces the resilient connection of the lower end of the bell crank to the tractor hitch; and the rearward end of the Rehn fore-and-aft extending link is slidably received in a trunion disposed on a radial arm fixed to the rockshaft. A compression spring placed between an abutment on the end of the link and said trunion biases a stop on the lever against the forward end of the frame but only in the lowered position of the wheels, or transport position of the frame.

In accordance with this invention, a mechanism is utilized which incorporates the advantages of the above-described linkages while overcoming the disadvantages thereof. Thus, the present invention embodies a rigid fore-and-aft extending articulate linkage which interconnects the hitch structure with the rockshaft such that both the fore and aft ends of the implements are raised or lowered proportionately equal amounts and the implement frame is maintained in a level position or at a preadjusted attitude both in the tilling and transport positions of the implement frame. Additionally, a spring-loaded link is incorporated in the linkage in such a way as to provide shock absorbing relief to the hitch structure when passing over irregular ground features such as rocks, waterways, dirt, furrows and the like, but does not interrupt the hitch angling function of the articulate linkage. This shock absorption feature is available to the implement at all vertical levels to which its frame is raised or lowered.

In the accomplishment thereof, the invention utilizes a bell crank lever which is hinged at its apex to the hitch structure forwardly of its hinged connection to the implement frame. One arm of the bell crank lever is hinged to the fore end of a rigid link and its other arm is connected to swing on the lower end of a preferably vertically disposed spring-loaded link which is anchored at its upper end to the forward end of the frame. In its presently preferred form, as hereinafter described, such a spring-loaded link embodies a first rigid member which is anchored to the implement frame and embodies a pair of vertically spaced stops between which a spring is loaded in compression. The spring-loaded link also embodies a second rigid member which is pivotally connected to the bell crank lever and has spaced abutments at either end of the loaded spring which act thereon. In either direction of swing of the lever on its hinged connection, the spring reacts in compression to either a tensile or compressive load on its supporting structure to enforce a constant attitude of the implement at all levels to which the frame is elevated and lowered with rotation of the rockshaft. In the disclosed arrangement, the spring-loaded link is further available to constitute a shock absorbing resilient connection between the frame and hitch structure.

In its preferred form, connection of the spring-loaded link to the forward end of the frame is made adjustable to provide for adjustment of the hitch clevis height to match different tractor drawbar heights.

Thus, a linkage system in accordance with the present invention has the positive attitude control of the earlier rigid linkage mechanism and also the shock and severe loading compensations of the later spring-type linkage systems.

Among the features of the invention are that positive means is provided to control the attitude of the implement frame at any vertical level of the disc frame.

A further frame of the invention is that spring relief is also provided to minimize shock load on the implement during the tilling act and/or when transported over the road at high speed behind the tractor.

Another feature of the invention is that the tension or compression of the rigid connector level which connects the rockshaft to the hitch is continuously working against the resiliency of the spring-link in either direction of elevation or lowering of the implement frame.

A further feature of the invention is that the height of the hitch can be adjusted without changing the linkage geometry and thereby its effectiveness to resist shock and to maintain loads stability.

A further feature of the invention is that by adjusting the height of the spring-link connection to the main frame, the hitch structure may be raised or lowered about its hinge connection to the implement frame to shift the load from the front to the rear gangs or reverse.

A further feature of the invention is that the adjustable connection of the spring-loaded link facilitates operator-adjustment of the implement load to change the frame attitude and redistribute the implement load on the front and rear tool gangs. Furthermore, this adjustment is obtainable without inhibiting the performance of the linkage mechanism.

Many other objects of the invention, features and advantages thereof will be at once apparent or will become so upon consideration of the preferred embodiment of the invention which now will be described in connection with the several figures embodying the drawing.

Referring now to the drawing:

FIG. 1 is a top plan view of an agricultural implement such as a disc harrow in which an embodiment of the invention has been incorporated;

FIG. 2 illustrates the implement in side elevation with its wheels lowered to their transport position, portions thereof being cut away and fragmented to illustrate details of its construction;

FIG. 3 is a view generally similar to FIG. 2 but with different portions of the structure fragmented or cut away and illustrates the implement with its transport wheels in an elevated position so that implement tools are in soil penetrating or tilling position;

FIG. 4 is a fragmented view on an enlarged scale of the bell crank lever and shows its connections to the fore end of the tension link, to the hitch structure, and through the spring-loaded link to the forward end of the implement frame;

FIG. 5 is a sectional view taken along lines 5—5 of FIG. 4 looking into the direction indicated by the arrow;

FIG. 6 is a front elevational view of the spring link and illustrates the action thereof when the bell crank lever is rotated in a counterclockwise direction; and FIG. 7 is a view generally similar to FIG. 6 and illustrates the action of the spring-loaded link in response to clockwise rotation of the bell crank lever.

Referring now more particularly to the several views wherein like parts are identified by like reference numerals, the invention is illustrated as embodied in an agricultural implement adapted to be pulled behind a tractor to perform tilling functions. In FIGS. 1 and 2, one such exemplary agricultural implement comprises a disc harrow having a tool supporting frame 10 which is supported on vertically elevatable wheels 11 and has a tractor hitch 12 hinged to its forward end for relative vertical movement about a transverse axis spaced forwardly of and parallel to the axis on which the wheels turn. The outer end of said hitch 12 comprises a vertically apertured clevis 13 by which it may be removably attached to the drawbar A of a tractor utilizing a hitch pin P. The vertical disposition of the hitch pin accommodates horizontal hinging of the implement frame relative to the pulling tractor.

Implement frame 10 may be of any suitable construction; and, in the illustrated disc harrow, it comprises generally parallel spaced front and rear frame members 14, 15 formed of strong rigid tubular shaped metal stock to which are welded or otherwise rigidly united fore-and-aft extending side members (not shown) and a similarly directed, centrally disposed pair of parallel spaced members 16 and 17 also formed of similarly strong rigid tubular metal stock. Said frame members 16 and 17 together with front and rear frame members 14 and 15 by their union thereto constitute a centrally disposed generally-rectangular shaped support to which the tools, the supporting wheels, the operating structure therefor, and the hitch are mounted. At 18 is a transversely extending brace member which is connected at its opposed ends to said frame members 16, 17 and lends reinforcement to their wheel and hitch supporting function. Located beneath said frame 10 are spaced-apart front and rear tool gangs identified generally at 19 and 20. Such gangs may be of any suitable construction and in the exemplary disc harrow, each gang comprises a pair of angularly related supporting beams 21, 22 which are joined at their meeting inner ends and rigidly united to said fore-and-aft extending side members of the frame, as well as centrally disposed frame members 16, 17 as by bolts or other suitable connecting means. Depending from said beams 21, 22 at regular spaced intervals are standards 23, the lower ends of which comprise bearings in which an elongated gang of spacer-separated disc blades 24 are rotatably mounted. As illustrated in FIG. 1, the forward gangs 20 of disc blades are arranged in forwardly diverging relation and the rear gangs 19 of disc blades are arranged in rearwardly diverging relation. Suitable structure not shown may be provided to permit adjusting the working angle of each gang to accommodate specific soil conditions met in tilling.

Spaced intermediate said front and rear tool gangs 19, 20 and extending generally parallel to the forward frame member 14 is a transversely extending rockshaft 25 rotatably supported within suitable bearing brackets 26 which are rigidly fixed by bolts or otherwise to the underside of the frame members 16, 17. Fixed to the opposed ends of rockshaft 25 outboard of said frame members 16, 17 are aligned vertically extending wheel arms 27 having bearing ends 28 in which are rotatably mounted the axles of ground engaging transport wheels 29. It will be appreciated that, by rotation of rockshaft 25 on its longitudinal axis y—y which parallels forward frame member 14, the angular disposition of the wheels supporting arms 27 to frame 10 can be changed and thereby the height of the frame 10 raised or lowered relative to ground level G. Rockshaft 25 thus constitutes means for vertically adjusting frame 10 between its transport position as illustrated in FIG. 2 wherein the tool gangs 19, 20 and the disc blades 24 are supported above ground level G and a lower tilling position such as illustrated in FIG. 3 wherein the wheels 29 permit discs 24 to penetrate the soil under the load of the implement frame 10. Commonly, the transport wheels 29 are not raised to the height illustrated by full lines in FIG. 3, but remain in engagement with the ground level so as to act as gauging wheels to regulate the depth to which the disc blades are allowed to penetrate the soil during the tilling operation. In the exemplary disc harrow, clockwise and counterclockwise rotation of rockshaft 25 about its axis y—y is obtained through actuation of a pair of hydraulic rams indicated at 30. Each said rams as illustrated in FIG. 1, comprises a cylinder 31 suitably mounted to the inner side of a respective one of the aforementioned supporting frame member 16, 17. Reciprocatable within each said cylinders is a piston 32 having its outer end pivotally connected to one end of a link 33 having its opposite end connected to an arm 34 affixed rigid to the rockshaft 25, said connection being radially offset from the rockshaft axis y—y. Conventionally, said hydraulic cylinders 31 have their opposed ends connected by suitable hydraulic hoses not shown to the hydraulic system of the tractor used to pull the implement so that the two rams can be operated in unison under the control of the farmer or other individual driving the tractor. Thus, when piston 32 of said rams 30 are operated in extension, rockshaft 25 is turned on its axis in a counterclockwise direction to elevate the implement frame into its transport position (FIG. 2) and by retracting the piston within the cylinder, the rockshaft is turned in a clockwise direction to effect lowering of the frame 10 to one of its tilling levels (FIG. 3).

For the purposes of this invention, it will be understood that axis y—y on which the rockshaft 25 turns is disposed generally horizontal and transversely of frame 10 and the axis x—x on which the hitch structure 12 aforementioned is hinged to the frame is disposed forwardly of and generally parallel to said rockshaft turning axis y—y. Hitch structure 12 may be of any suitable construction, and in the exemplary form illustrated in FIGS. 1 and 2, it comprises a triangular frame embodying laterally spaced side members 35 having convergingly related outer ends united by upper and lower plates 36 suitably bolted thereto and vertically apertured at 37 to constitute the aforementioned tractor attaching clevis 13. The opposed ends of said hitch side members 35 comprise parallel disposed terminal portions 39 which are hinged as at 40 to depending hinge supports 41, the latter being bolted at their upper ends as to respective side members 16 and 17 of the frame 10. The location of said hinge axis is reinforced by a tubular beam 42 which is rigidly connected between the depending hinge supports 41. For a similar reason, a tubular brace member 43 is disposed between and rigidly united to the terminal portion 39 of the hitch structure.

It will be understood that the agricultural implement as thus far described is conventional in its construction and the aforesaid description thereof is intended to be merely exemplary of an agricultural implement in which a constant frame attitude maintaining mechanism in accordance with this invention has utility. It should be understood also that the invention now about to be described may be embodied in agricultural implement of types other than a disc harrow. For example, it may be utilized in a chisel plow, a field cultivator, or a mulcher, assuming such implements have a similar type vertical elevating mechanism for their frame and a hitch structure similarly hinged thereto. In such implements, for example, the supported tools may be supported from similar gang beams, but which are differently oriented to the supporting frame. The tools may be supported from said gang beams by different structure and the tools themselves may be different. For example, the tools of a mulcher conventionally comprise rollers with interspersed serrated discs and the tools of a field cultivator or chisel plow may comprise curved or spike-shaped teeth. In all such implements, for purposes of this invention, the hitch structure will be adapted to swing on a hinge axis x—x spaced forwardly of, usually beneath and behind the forward end of the frame and generally parallel to axis y—y on which the rockshaft 25 or other wheel elevating mechanism turns or swings to effectively change the attitude of the implement wheel arms and thereby to raise or lower the frame between a tilling and a transport level.

In accordance with this invention, an agricultural implement as aforedescribed is provided with a shock absorbing mechanism capable of maintaining the frame attitude either level, that is horizontal, or at an adjusted angle to the horizontal, in both its transport and tilling positions. Such a mechanism may comprise a single system of links interconnecting the hitch structure 12 and the wheel elevating rockshaft 25, as now to be described. However, in the illustrated embodiment of the invention, such mechanism comprises a pair of linkage systems disposed inboard of the fore-and-aft extending frame members 16, 17 and equidistantly to either side of a vertical center line extending longitudinally of the implement frame and intersecting the clevis end of the hitch structure 12, said linkage systems being indicated at 50 in FIG. 1.

Considering FIGS. 2 and 3 with FIG. 1, each said linkage systems is illustrated as comprising a fore-and-aft extending, generally horizontally disposed, compression-tension link 51 of a fixed length having one end pivotally connected as by a pin 52 to a radially extending arm 53 made rigid with said rockshaft to swing with rotation thereof about its axis y—y. The opposite or forward end of said link 51 is pivotally connected by a pin 54 to the longer first arm 61 of a right angled bell crank lever 60, the apex 62 of which lever is hinged to hitch 12. As shown best in FIG. 1, cross brace member 43, which interconnects the terminal ends of the hitch structure 12, provides convenient support for a pair of laterally spaced brackets 64 which are welded or otherwise fixed to the forward side of said member 43. Each said brackets comprises a pair of forwardly extending spaced ears between which the apex 62 of the two bell crank levers 60 are located and secured by pivot pins 63 for pivotally swinging on a common axis disposed beneath frame 10 and forwardly of the hitch hinge axis x—x which it parallels and behind the forward end member 14 of the frame 10.

Considering now FIGS. 4 and 5 with FIG. 2, said bell crank lever 60 has a forwardly extending shorter arm 65 which is pivotally connected at its outer end to the lower end of a spring-loaded link 70 which is anchored at its upper end at a fixed point to the forward end of the implement frame 10.

As shown best in said FIGS. 4 and 5, in their presently preferred form, each said spring-loaded links 70 comprise a first inner rigid member 71 having an intermediate portion 72 of uniform cylindrical cross section, said intermediate portion 72 comprising the major portion of the length of said inner rigid member. The upper end portion 73 of said inner member 71 is externally threaded and extends through a provided aperture in the bight portion 74a of a generally u-shaped mounting member 74. Said bight portion 74a of the mounting member has an internally threaded nut 75 welded thereto and threadedly connected to the upper end portion 73 of the inner rigid member 71. As shown best in FIG. 5, the depending legs 74b of said mounting member 74 are located between and pivotally connected by bolts 77 to spaced ears of mounting brackets 78 which are welded or otherwise rigidly fixed to the forward side of frame member 14. Bolts 77 pivotally connect mounting member 74 and thereby the upper end of the inner rigid member 71 to the frame for pivotal movement about a common axis disposed forwardly of and above the frame 10 and parallel with the common axis (connection 63) on which the bell crank levers 60 swing. Encircling the intermediate portion 72 of said inner rigid members 71 of each said spring-loaded links 70, is a helically coiled compression spring 80; and inserted within the respective ends of the compression spring 80 are upper and lower sleeve assemblies 90 slidably mounted on said intermediate portion 20 of the inner rigid member 71. As illustrated best in FIG. 4, each said slidable sleeve assemblies includes a first or inner portion 91 of reduced cross-section which extends within the respective end of the compression spring 80, a surrounding flange portion 92 of greater cross-section which engages the respective end of the compression spring 80 and an outer portion 93 of reduced cross-section which engages stop means fixed to the inner rigid member 71. As illustrated in FIG. 4, the lower one of said stops is indicated generally at 100 and comprises an enlarged or shouldered integral portion of the inner rigid member 71 against which the outer portion 93 of the lower sleeve assembly 90 is pressed by spring 80. The upper stop is illustrated as comprising an internally threaded nut 101 which is threadedly connected to the externally threaded upper portion 72 of the inner rigid member. It serves to be engaged by the upper slidable sleeve assembly 90. Upper stop 101 is thus vertically adjustable axially of the inner rigid member 71 to change the distance separating stops 101 and 100 and therefor constitute means to adjust the preloading of the compression spring 80.

The spring-loaded links 70 also have an outer rigid member 110 which is pivotally connected to the free end of lever arm 65. In the illustrated embodiment, said outer rigid member comprising a cylindrical body of a length to enclose the compression spring 80 and having an annular shaped closed end portion 111 through which protrudes the upper end 73 of the inner rigid member 71 and also the outer portion 93 of the upper sleeve assembly 90. In FIG. 4, end portion 111 is shown engaging the outer side of flange portion 92 of the upper sleeve assembly 90.

As seen best in FIG. 5, the lower end of the outer cylindrical rigid member 110 has a pair of parallel spaced plates 112 rigidly connected at their upper ends to the lower portion of the cylindrical body member 111 by a pair of through-bolts 113 which lie beneath flange portion 92 and to either side of the outer portion 93 of the lower sleeve assembly slidably mounted about the inner rigid member 71. Still referring to FIG. 5, the thus rigidly connected plates 112 are shown pivotally connected at their lower ends as by bolts 114 to the outer sides of the free end of the two parallel spaced plates 65a which comprise the shorter arm 65 of the bell crank lever 60, and provide operating space for the depending end of the inner rigid member 71 of the spring-loaded lever 70.

As afterwards explained bolts 114 defined an axis z—z on which the bell crank 60 is capable of swinging in response to fore-and-aft movement of links 51 to effectively raise and lower the hinged end of the hitch 12.

Considering now also FIGS. 6 and 7, a feature of the invention is that compression spring 80 when preloaded by appropriate adjustment of stop 101 to fixed stop 100 on the inner rigid member 71 is capable of resisting both extension and compression of the link to provide a stabilizing force acting on the bell crank lever 60 in either direction in which it is rotated about its pivotal connection 114 to the frames 10, 12 to effect elevation or lowering of the frame 10.

Assume the implement frame to be in its elevated transport position as illustrated by FIG. 2 and it is desired to lower the frame 10 to locate its tool gangs 19, 20 into one of several possible tilling positions, one of which is illustrated in FIG. 3 by full lines and two others by dash lines. This the operator accomplishes by actuating hydraulic rams 30 to retract pistons 32 within their respective cylinders 31. By reason of the offset connection of the pistons to collars 34 on rockshaft 25, the latter is rotated in a clockwise direction to reduce the included angle between the wheel supporting arms 27 and the frame 10 causing the wheel supported end of the frame to correspondingly lower. Simultaneously, link 51 by reason of its offset connection 52 to rockshaft 25 through radial arm 53 exerts a forwardly directed force on its end connected to the bell crank lever 60 at 54 causing the bell crank lever to also rotate in a clockwise direction about its connection 114 or axis z—z to the lower end of the spring-loaded link 70 transmitting a raising force to the hinged end of the hitch. The clevis end of the hitch, however, remains at its fixed height determined by the tractor drawbar A to which it is attached. The force thus exerted by the tension link 50 acts upon the hitch and is transferred through plates 112 to the outer rigid member 110 of the spring-loaded link 70. As the outer rigid member 110 is pulled downwardly, its annular end portion 111 engages flange 73 of the upper sleeve assembly 90 urging it to slide downwardly along the inner rigid member against spring 80, the spring 80, however, being capable of further compression therebetween and the lower stop 100. Compression spring 80 thus reacts under the force exerted by rotation of the rockshaft 25 to exert a stabilizing force on the bell crank lever so that in the lowering act of the frame, it maintains a horizontal or level position.

Conversely, when the hydraulic rams are actuated to rotate rockshaft 25 in a counterclockwise direction so as to return the implement frame to its raised transport position illustrated by FIG. 2, a pulling force is exerted on tension link 51 which urges it in a rearward direction and so that the crank arm lever 60 is again swung about axis z—z but this time in a counterclockwise direction, causing its shorter arm 65 to again act on the outer rigid member 111, but this time in an upward direction. Thus, as said shorter arm 65 of the bell crank lever rises through-bolts 113 are urged upwardly against the flange portion 92 of the lower sleeve assembly 90 causing compression spring 80 this time to be further compressed therebetween and the flange portion of the upper sleeve assembly, the upward movement of the upper sleeve assembly being resisted now by the upper stop 101. Thus, in both the elevating and lowering of the implement frame, the load of the frame is bypassed through the resilient connection of the tension link 51 to bell crank lever 60 and the implement frame 10 remains horizontal or level in its various tilling positions as well as its transport position. Thus, in either direction of rotation of the bell crank lever 60, the spring-loaded link 70 exerts a stabilizing force as the hitch end of the frame 10 is correspondingly raised or lowered with its wheel supported end and the frame maintains a constant attitude.

At the same time, the resilient connection which the spring-loaded link 70 provides between its anchor at 79 to the forward end of the frame and its connection at 114 to the bell crank lever 60 is available to absorb shock under dynamic loading conditions otherwise exertable directly to the hitch as when the implement is being pulled behind a tractor.

It will be appreciated further, that by rotating the inner rigid member 71 in its threaded connection to the mounting member 74, it is possible to raise and lower the inner rigid member 90 and thereby the spring-loaded link 70 without otherwise disturbing the geometry of the linkage systems. This feature permits both ready adjustment of the hitch clevis 13 to match various drawbar heights and, alternatively, to alter the attitude of the frame and thereby to redistribute the load of the implement frame non-equally between the front and rear tool gangs 19, 20. For this purpose, the protruding upper end of the rigid link 71 is provided with a hexagonal shaped head 130 immobilely affixed thereto as by pins which may be conveniently grasped between the jaws of the wrench to effect said adjustment. Because the geometry of the linkage is not otherwise altered, the thus adjusted attitude of the frame is maintained.

From the aforesaid description of a preferred embodiment of the invention and its utilization in an agricultural implement such as a disc harrow, it will be appreciated that all of the recited objects, advantages, and features of the invention have been demonstrated as readily obtainable in a structure that is practical, simple and economical to manufacture as well as to utilize.

Having described the invention, we claim:

1. In an agricultural implement which comprises a tool supporting frame having a tractor hitch structure hinged to one end thereof for relative vertical movement of the hitch structure about a transverse axis and a transversely extending rockshaft spaced from said transverse axis to which ground engaging wheels are fixed in offset relation to the axis of the rockshaft on which it turns to vertically adjust the wheels and thereby elevate and lower the frame, the improvement wherein,
   a lever is pivotally connected to the hitch structure in offset relation to said transverse axis for fore and aft movement of the lever;
   a fore and aft extending rigid link having one end pivotally connected to the rockshaft in offset relation to the axis on which it turns has its opposite end pivotally connected to said lever; and
   a spring-loaded link connected between the lever and the tool supporting frame reacts in compression against the lever in either direction of its rotation to constitute a shock absorbing yielding connection between the frame and hitch structure while enforcing a constant attitude of the frame at the different levels to which the frame is elevated and lowered by rotation of the rockshaft.

2. The improvement of claim 1 wherein the connection of the spring-loaded link to the frame is adjustable to alter the attitude of the frame on the hitch structure.

3. The improvement of claim 1 wherein the spring-loaded link is disposed generally vertical.

4. The improvement according to claim 1 wherein the spring-loaded link embodies a first rigid member which is anchored at one end to the tool supporting frame and has a pair of spaced stops between which a spring is loaded in compression, said spring-loaded link further including a second rigid member which is pivotally connected to the lever and acts on the loaded spring in either direction of movement of the lever on its pivotal connection to the hitch structure to further compress the spring therebetween and one of said stops.

5. The improvement as claimed in claim 4 wherein the spring-loaded link includes adjustable means for altering the spacing of the anchored end of said spring-loaded link to the frame from the pivotal connection of the lever to said spring-loaded link.

6. The improvement as claimed in claim 1 wherein the lever has an intermediate portion pivotally connected to the hitch structure forwardly of said transverse axis, the fore-and-aft extending rigid link being pivotally connected to one end of said lever and the spring-loaded link to the other end of said lever.

7. The improvement as claimed in claim 6 wherein the lever is a bell crank pivotally connected to the hitch structure at its apex.

8. In an agricultural implement which comprises a tool mounting frame having a tractor structure hinged to beneath the forward end of the frame and a rotatable rockshaft spaced therebehind to which transport wheels are rotatably fixed in offset relation for elevation and lowering of the tool frame in response to rotation of the rockshaft, the improvement wherein a bell crank lever having first and second angularly related arms is pivotally connected at its apex between said arms to the hitch structure, a rigid connecting link is pivotally connected at one end to said rockshaft in offset relation to its rotational axis and at its other end to one arm of said bell crank lever, and a spring-loaded link has a first rigid member pivotally connected to the second arm of the bell crank lever and a second rigid member anchored to the tool supporting frame, said rigid members being in axially sidable overlapping relation, and a compressible spring member disposed between said rigid members, an abutment member slidably mounted on one said rigid members at each end of the spring member, and stop means on the said one rigid member at either end of the spring which resist movement of said slidable abutment members in directions away from the adjacent ends of the spring member, and the other of said rigid members having portions engaging with said abutment members such that the spring is further compressed in response to both fore and aft pivoting of the bellcrank on its connection to the hitch structure.

9. The improvement of claim 8 wherein the bell crank lever is pivotally connected to the hitch structure forwardly of its hinged connection to the implement frame and the spring-loaded link is disposed generally vertical.

10. The improvement of claim 8 wherein the first and second rigid members of the spring-loaded link are in telescopic relation, the compressible spring member encircling the inner one of said rigid members and surrounded by the outer of said rigid members.

11. The improvement of claim 10 wherein the stop members are fixed to the inner rigid member and the abutment members are slidably mounted on said inner rigid member between the respective ends of the spring member and the adjacent one of said stop means.

12. The improvement of claim 11 wherein the slidable abutment members each include a first portion of enlarged cross section which engages the adjacent end of the spring member and an outer sleeve portion of reduced cross section which engages the adjacent stop means on the inner rigid member, and the outer rigid member has a portion at each end thereof disposed between the first portion of one said slidable abutment members and the adjacent stop means of the inner rigid member such that pivotal movement of the bell crank lever on the hitch structure in either direction transmits a compressive force against one end of the spring member which is resisted by an abutment member at the other end of the spring member.

13. In an agricultural implement which comprises a tool mounting frame having a tractor hitch structure hinged to beneath the forward end of the frame and a rotatable rock shaft spaced therebehind to which transport wheels are rotatably fixed in axial offset relation for elevation and lowering of the tool frame in response to rotation of the rockshaft, the combination comprising a radial arm fixed to the rockshaft to turn therewith in response to elevation and lowering of the transport wheels, a bell crank lever having first and second angularly related arms, said lever being pivotally connected at its apex between said arms to the hitch structure forwardly of said hinged connection of the hitch structure to the frame, a rigid connecting link having one end pivotally connected to said radial arm and its other end pivotally connected to the first arm of said bell crank lever, and a vertically-extending spring-loaded link including an inner rigid member anchored at its upper end to the tool supporting frame, a compressible spring member encircling said inner rigid member, and an outer rigid member surrounding said spring and inner rigid member, said outer rigid member being pivotally connected at its lower end to the second arm of the bell crank lever, an abutment member slidably mounted on the inner rigid member at each end of the spring member, and stop means on the inner rigid member which resist movement of said slidable abutment members in directions away from the adjacent ends of the spring member, said outer rigid member having spaced portions which act on said slidable abutment members such that the spring is compressed between said moveable abutment members in response to pivoting of the bellcrank in either direction of pivoting of the bell crank on the hitch structure.

14. The combination of claim 13 wherein the abutment members each comprise a sleeve having a flanged end which engages the adjacent end of the spring member and an opposite end which engages the adjacent one of the stop means.

15. The combination of claim 14 wherein the encircling outer rigid member has engagement portions as its opposed ends for releaseably engaging the outer side of the flanged end of the slidable abutment members such that the bell crank lever transmits a compressive force against one end of the spring member which is resisted by one of the stop means in both fore and aft pivoting of the bell crank lever such that the spring-loaded link constitutes a shock absorbing connection between the tool mounting frame and its hitch structure while enforcing a constant attitude of the frame at the levels to which it is elevated and lowered by rotation of the rockshaft.

16. The combination of claim 15 wherein the inner rigid member further includes adjustment means for changing the separation of the anchored end of the spring-loaded link to the implement frame from its pivotal connection to the bell crank lever.

* * * * *

UNITED STATES PATENT OFFICE
CERTIFICATE OF CORRECTION

Patent No. 4,108,249            Dated   August 22, 1978

Inventor(s)  Carl M. Anderson et al.

It is certified that error appears in the above-identified patent and that said Letters Patent are hereby corrected as shown below:

Column 3, line 4, "frame" should read -- feature --.

Signed and Sealed this

Twenty-seventh Day of February 1979

[SEAL]

Attest:

RUTH C. MASON
*Attesting Officer*

DONALD W. BANNER
*Commissioner of Patents and Trademarks*